United States Patent
Gardner et al.

(10) Patent No.: US 8,236,441 B2
(45) Date of Patent: Aug. 7, 2012

(54) BATTERY CELL DESIGN AND METHODS OF ITS CONSTRUCTION

(75) Inventors: William H. Gardner, East Freetown, MA (US); Grace S. Chang, Watertown, MA (US)

(73) Assignee: A123 Systems, Inc., Waltham, MA (US)

( * ) Notice: Subject to any disclaimer, the term of this patent is extended or adjusted under 35 U.S.C. 154(b) by 1049 days.

(21) Appl. No.: 12/178,538

(22) Filed: Jul. 23, 2008

(65) Prior Publication Data

US 2009/0029240 A1   Jan. 29, 2009

Related U.S. Application Data

(60) Provisional application No. 60/951,571, filed on Jul. 24, 2007.

(51) Int. Cl.
*H01M 2/26* (2006.01)
*H01M 2/20* (2006.01)
*H01M 4/66* (2006.01)

(52) U.S. Cl. ........... 429/94; 429/161; 429/164; 429/211

(58) Field of Classification Search ................ None
See application file for complete search history.

(56) References Cited

U.S. PATENT DOCUMENTS

| | | |
|---|---|---|
| 3,823,040 A | 7/1974 | Jagid |
| 4,049,888 A * | 9/1977 | Flender ........................ 429/115 |
| 4,383,013 A | 5/1983 | Bindin et al. |
| 4,400,415 A | 8/1983 | Kessler et al. |
| 4,966,822 A | 10/1990 | Johnston |
| 5,464,705 A | 11/1995 | Wainwright |
| 5,554,459 A | 9/1996 | Gozdz et al. |
| 5,773,164 A | 6/1998 | Venkatesan et al. |
| 5,834,133 A | 11/1998 | Narukawa et al. |
| 5,866,274 A | 2/1999 | Mawston et al. |
| 5,876,237 A | 3/1999 | Patel et al. |

(Continued)

FOREIGN PATENT DOCUMENTS

EP   0771040 A2   5/1997

(Continued)

OTHER PUBLICATIONS

International Search Report and Written Opinion, International Patent Application No. PCT/US08/71041, mailed Sep. 29, 2008 (7 pages).

(Continued)

*Primary Examiner* — Robert Hodge
(74) *Attorney, Agent, or Firm* — Wilmer Cutler Pickering Hale & Dorr LLP

(57) ABSTRACT

In some embodiments, a battery cell can include an assembly having an anode sheet and a cathode sheet separated by separator membranes, each sheet having an electroactive layer on a current collector. At least one of the current collectors can be in electrical communication with conducting tabs that extend from at least one of the anode sheet and the cathode sheet, the conducting tabs extends from an end face of the spirally wound assembly. In addition, the cell can include a first tab insulator having concentrically positioned outer and inner members, each of the outer and inner members having at least one slot that allows one or more of the plurality of conducting tabs to pass through. The inner and outer members are adjustable with respect to relative angular orientation of the at least one slot on the outer and inner members of the first tab insulator.

15 Claims, 13 Drawing Sheets

U.S. PATENT DOCUMENTS

| | | |
|---|---|---|
| 6,071,638 A | 6/2000 | Fradin |
| 6,080,506 A | 6/2000 | Davis et al. |
| 6,083,639 A | 7/2000 | McHugh et al. |
| 6,159,253 A | 12/2000 | Lund |
| 6,197,074 B1 | 3/2001 | Satou et al. |
| 6,344,292 B1 | 2/2002 | Nemoto et al. |
| 6,432,574 B1 | 8/2002 | Suzuki et al. |
| 6,521,374 B1 | 2/2003 | Nakanishi et al. |
| 6,673,128 B2 | 1/2004 | Payne et al. |
| RE38,518 E | 5/2004 | Tucholski |
| 6,780,303 B2 | 8/2004 | Colombier |
| 6,875,540 B2 | 4/2005 | Nemoto et al. |
| 6,884,541 B2 | 4/2005 | Enomoto et al. |
| 7,033,697 B2 | 4/2006 | Park et al. |
| 7,927,732 B2 | 4/2011 | Myerberg et al. |
| 8,084,158 B2 * | 12/2011 | Chu et al. ............ 429/211 |
| 2001/0038945 A1 | 11/2001 | Kitoh et al. |
| 2003/0035993 A1 | 2/2003 | Enomoto et al. |
| 2003/0091893 A1 | 5/2003 | Kishiyama et al. |
| 2003/0175587 A1 | 9/2003 | Okutani et al. |
| 2003/0194601 A1 | 10/2003 | Lei |
| 2003/0211388 A1 | 11/2003 | Ruth et al. |
| 2004/0023108 A1 | 2/2004 | Nakanishi et al. |
| 2004/0121230 A1 | 6/2004 | Fong et al. |
| 2004/0157115 A1 | 8/2004 | Bouffard et al. |
| 2004/0157120 A1 | 8/2004 | Wu |
| 2004/0214076 A1 | 10/2004 | Tsukamoto et al. |
| 2004/0237290 A1 | 12/2004 | Ura |
| 2004/0265683 A1 | 12/2004 | Merrill et al. |
| 2005/0255378 A1 | 11/2005 | Knight et al. |
| 2006/0124973 A1 | 6/2006 | Arai et al. |
| 2006/0172190 A1 | 8/2006 | Kaplin et al. |
| 2006/0210857 A1 | 9/2006 | Frank et al. |
| 2007/0117011 A1 | 5/2007 | Myerberg et al. |
| 2009/0109099 A1 | 4/2009 | Jang et al. |

FOREIGN PATENT DOCUMENTS

| | | |
|---|---|---|
| WO | WO-2005076936 A2 | 8/2005 |
| WO | WO-2007/028152 | 3/2007 |

OTHER PUBLICATIONS

International Search Report, International Application No. PCT/US2006/34478, mailed Aug. 13, 2007. (1 Page).

Supplementary European Search Report for European Patent Application No. 06814143.1 mailed May 9, 2011. 11 pages.

* cited by examiner

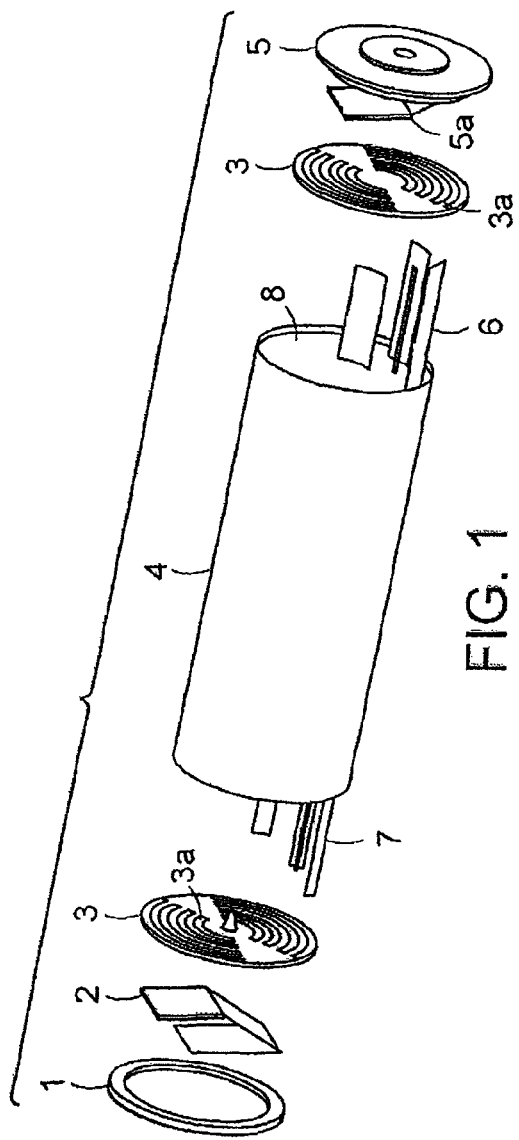
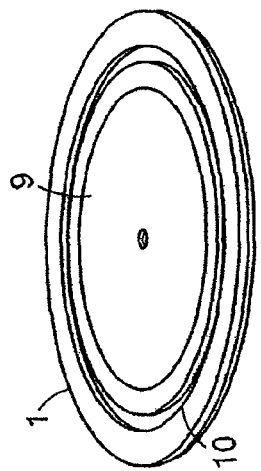
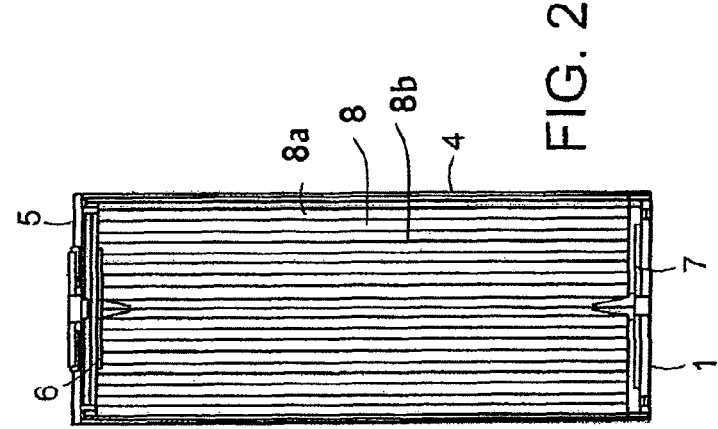
FIG. 1
FIG. 3
FIG. 2

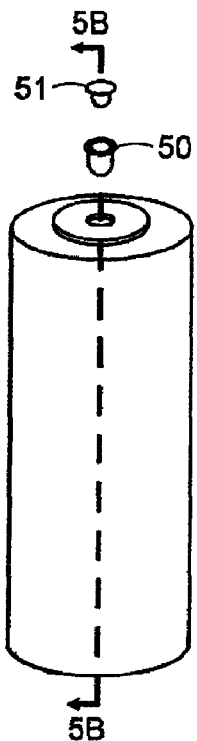
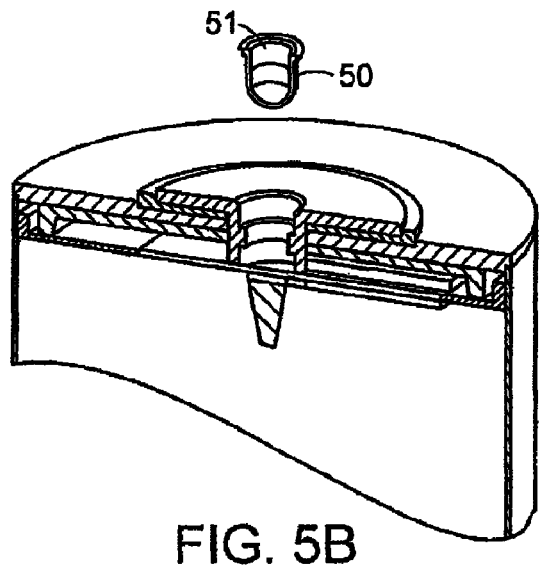
FIG. 5A
FIG. 5B
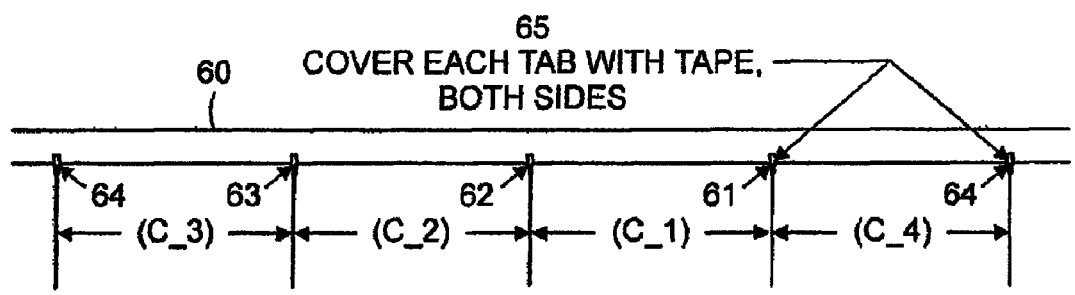
FIG. 6A
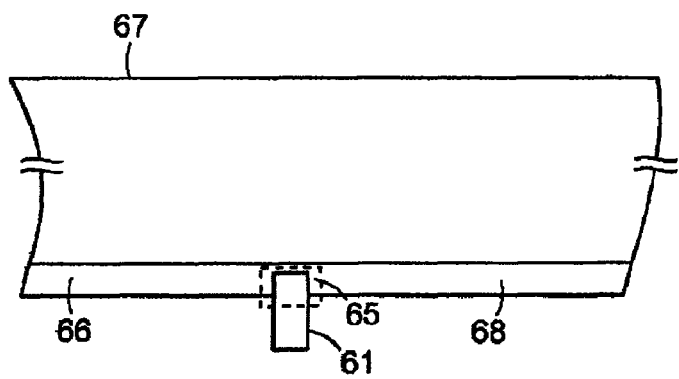
FIG. 6B

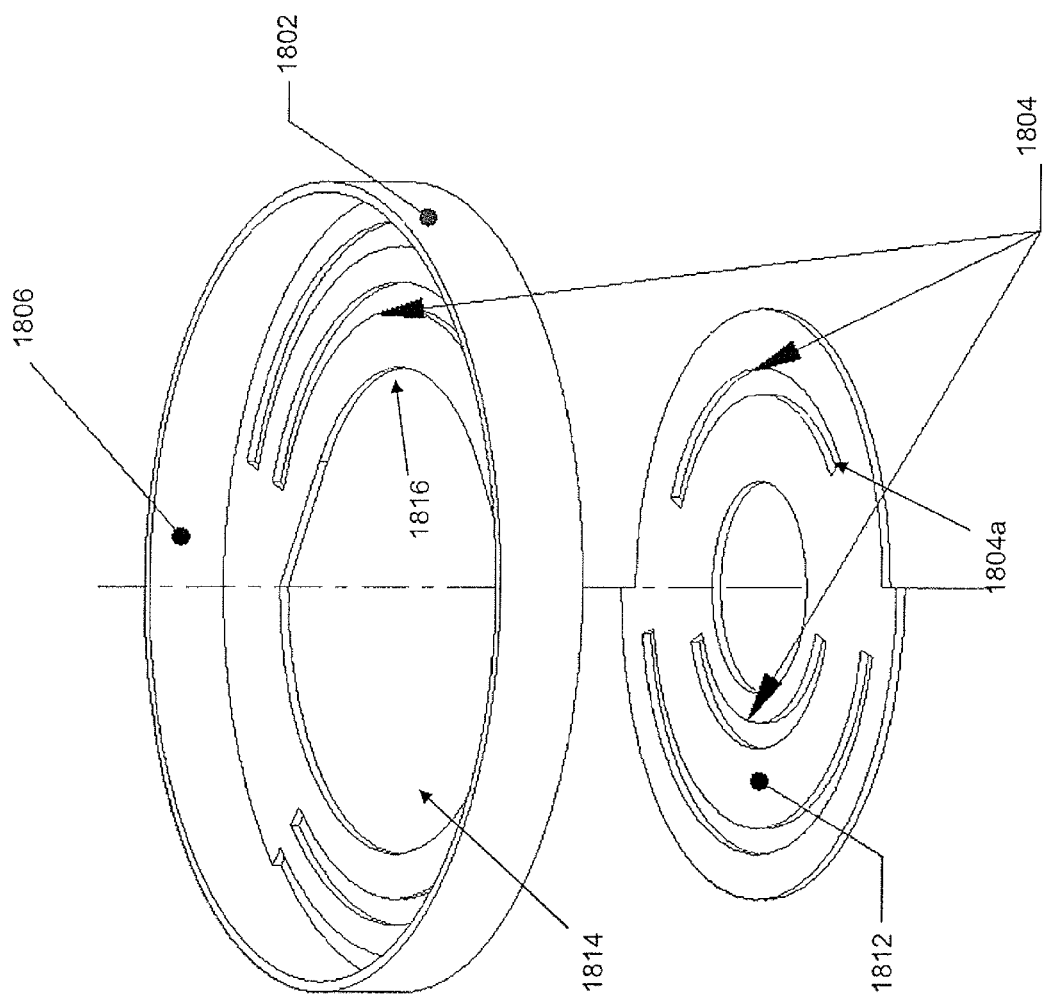

BATTERY CELL DESIGN AND METHODS OF ITS CONSTRUCTION

RELATED APPLICATION

This application claims priority from U.S. Provisional Patent Application No. 60/951,571, filed on Jul. 24, 2007, which is hereby incorporated by reference in its entirety. This application is also related to U.S. patent application Ser. No. 11/515,597, filed Sep. 5, 2006, U.S. Application No. 60/714,171, filed Sep. 2, 2005, and U.S. patent application Ser. No. 11/748,286, filed May 14, 2007, all of which are entitled "Battery Cell Design and Method of Its Construction," which are hereby incorporated by reference in their entirety.

FIELD OF THE INVENTION

The present invention generally relates to an electrochemical battery cell. More particularly, the present invention relates to a compact, robust, multifunctional and highly manufacturable rechargeable battery cell.

BACKGROUND

To facilitate manufacturing of electrochemical cells, current collecting tabs are often made longer than what is required by the final geometry of the cells. Because of this, the tabs are often formed into their final positions through a series of deliberate bends. As a result of inherent variation in manufacturing processes, the bending of the tabs may impart an undesirable force so that tab material makes contact with electrode of the opposing polarity, causing a short circuit and a non-functioning product. A short circuit can also be caused by a tab's movement due to cell cycling, mechanical shock, and/or vibration loading during the lifetime of the cell. To prevent short circuits, a tab insulator with one or more holes that allow one or more tabs to pass through can be used. However, because the relative positions of the tabs can vary significantly, an insulator that can accommodate multiple tabs and can be easily assembled into a working cell can be difficult to make, especially when there are 4 or more tabs to accommodate. It is also possible to cover each tab with adhesive backed polyimide material, and use additional strips of polyimide tape over the battery cell to prevent the tabs from contacting the cell. However, currently known polyimide tape adhesives soften considerably with exposure to heat or lithium ion cell electrolyte. This would allow the tape to move from its protective position on the tab during mechanical shock and vibration loads.

Improvements to address these and other limitations of conventional cylindrical and prismatic batteries are desired.

SUMMARY OF THE INVENTION

In one or more embodiments, an electrochemical cell can include an assembly, which may be a cylindrical spirally wound assembly, having an anode sheet and a cathode sheet separated by separator membranes, the cathode sheet having a first electroactive layer on a first current collector, and the anode sheet having a second electroactive layer on a second current collector, the spirally wound assembly having a cylindrical side wall and opposing end faces. The cell can also include conducting tabs that extend from at least one of the anode sheet and the cathode sheet, the tabs extending from an end face of the spirally wound assembly and in electrical communication with at least one of the first current collector and the second current collector. In addition, the cell can include a first tab insulator having concentrically positioned outer and inner members, each of the outer and inner members having at least one slot that allows one or more of the plurality of conducting tabs to pass through. The inner and outer members are adjustable with respect to relative angular orientation of the at least one slot on the outer and inner members of the first tab insulator.

In one or more embodiments, the slots on the outer member and/or the inner member are arc shaped. In one embodiment, at least one of the slots has an angular span of about 120-180 degrees. In another embodiment, at least one of the slots has an angular span of about 90 degrees.

In one or more embodiments, the outer member has a cylindrical side wall perpendicular to a face of the outer member.

In one or more embodiments, at least one of the outer member and the inner member has a rib shaped protrusion for facilitating the bending of at least one of the plurality of conducting tabs.

In one or more embodiments, at least one of the outer member and the inner member has one or more ridges for nesting the inner member with the outer member In one or more embodiments, the conducting tabs include 4 to 12 tabs.

In one or more embodiments, the first current collector is in electrical communication with a first plurality of conducting tabs that extend from the cathode sheet, and the second current collector is in electrical communication with a second plurality of conducting tabs that extend from the anode sheet. The first plurality of conducting tabs and the second plurality of conducting tabs extend from opposing end faces of the spirally wound assembly. In one embodiment, the cell further include a second tab insulator, and the first tab insulator and the second tab insulator are disposed on opposing faces of the spirally wound assembly.

In one or more embodiments, one of the inner and outer members has at least two slots that are located on opposites of the member with respect to the center of the member.

In one or more embodiments, a method of making an electrochemical cell is included. The method can include interposing a separator membrane between a positive electrode comprising a first electroactive layer on a first current collector and a negative electrode comprising a second electroactive layer on a second current collector to form a multilayer assembly, wherein each of the current collectors has a plurality of conductive tabs in electrical contact with and extending outward from the current collectors, wherein the tabs of the positive electrode and the tabs of the negative electrode are on opposite sides of the multilayer assembly. The method further includes spirally winding the multilayer assembly, fitting the tabs of the selected current collector through slots of a first tab insulator having an outer member and an inner member, wherein the first insulator is adjustable with respect to relative angular orientation of the outer member and the inner member. In addition, the method includes folding the tabs of the selected current collector towards the center of the spiral wound assembly such that the tabs intersect one another at a central axis, collecting the overlapped tabs of the selected current collector at a point beyond the tab intersection, and securing the collected tabs of the selected current collector to a connecting strap.

In one or more embodiments, a tab insulator for use in battery cells can include concentrically positioned outer member and inner members, each member having one or more slot that allows one or more conducting tabs of the battery cell to pass through. The inner and outer members are adjustable with respect to relative angular orientation of the slots of the inner and outer members.

BRIEF DESCRIPTION OF THE DRAWING

The invention is described with reference to the following figures, which are provided for the purpose of illustration only, the full scope of the invention being set forth in the claims that follow.

FIG. 1 is an exploded diagram illustrating the internal components of an exemplary battery cell that can use one or more embodiments of the invention.

FIG. 2 is a cross-sectional illustration of an exemplary assembled battery cell.

FIG. 3 is a view of a positive (cathode) end cap showing a pressure release vent and an interface terminal.

FIG. 5A depicts a perspective view the sealing of the fill hole in the negative end cap with a metal plug and a plastic seal after cell activation.

FIG. 5B depicts a cross-sectional enlarged view of the sealing of the fill hole in the negative end cap with a metal plug and a plastic seal after cell activation.

FIG. 6A is a plan view of an electrode sheet with tabs.

FIG. 6B is an enlarged plan view of an electrode sheet with tabs.

FIG. 18 is a perspective view of two members of a tab insulator, one member having a ridge to ensure that the two members stay concentric after assembly.

DETAILED DESCRIPTION

Figure 4A:
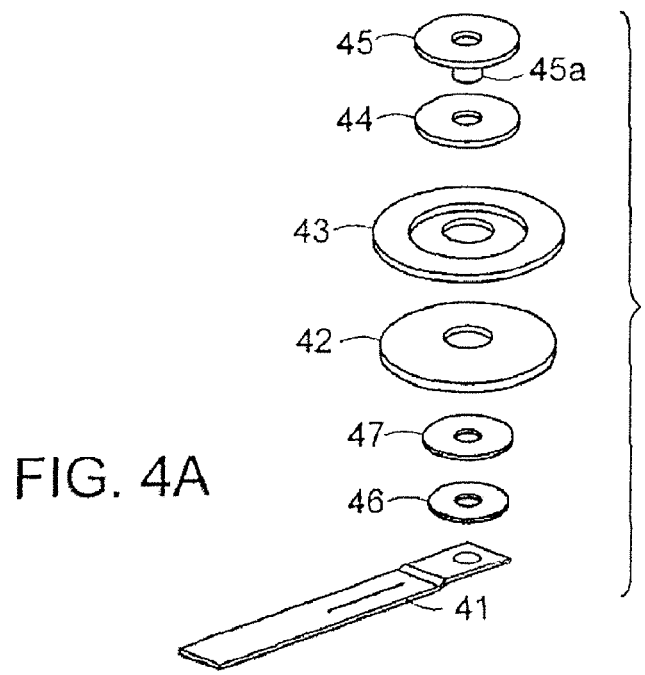
FIG. 4A provides an exploded view of the components used in a negative (anode) end cap assembly.

Embodiments of the present invention provide tab insulators that can be used on battery cells to prevent current collecting tabs from contacting electrode of opposite polarity. Exemplary embodiments of battery cells are illustrated in FIGS. 1-13. FIGS. 14-18 illustrate tab insulators according to one or more embodiments of the present invention. Although tab insulators according to some embodiments are described in connection with exemplary battery cells illustrated in FIGS. 1-13, it is to be understood that one or more embodiments of the invention can also be used on any other suitable battery cells.

A battery cell can include upper and lower welded end caps. The cell's primary packaging (can and end caps) can be composed of aluminum alloy. The weld seal is typically obtained by laser welding, or optionally by other metal joining methods such as ultrasonic welding, resistance welding, MIG welding, TIG welding. The end caps of the doubly (upper and lower ends) welded container may be thicker than the can wall; e.g., the end caps may be up to about 50% thicker than the can wall. This differential in thickness is not accomplished by other means, such as deep drawing. The doubly welded cell packaging can provide significantly greater cell volume than crimped seals or singly welded cells. In addition, the thick end caps improve mechanical robustness of the cell, for example, against crushing. The additional cell modifications incorporated into the cell design permit the use of a doubly welded packaging, which is not otherwise possible or convenient with conventional battery cell designs.

The battery cell package design uses a low weight and highly compact aluminum housing, and is typically an aluminum alloy such as Al3003H14. Aluminum and aluminum alloys provide high specific modulus and high specific stiffness in the structure and a high strength to weight ratio. Aluminum is also one of the few materials that are stable at the cathode potential of a Li-ion cell. Several features of the battery design are shown in the exploded diagram of FIG. 1. The cell design includes a positive end cap (1), a cathode extension tab (2), an insulation disc (3), a cylindrical tube (4), a negative end cap (5), anode current collection tabs (6), cathode current collection tabs (7), and internal active cathode and anode materials (electrodes) (8a and 8b). Although exemplary embodiments discuss cylindrical tubes, other shapes or outer configurations can be utilized. The positive end cap (1) contains both the positive battery terminal for the cell as well as the cell's vent mechanism. The cathode extension tab (2) acts as an electrical connection between the cathode current collection tabs (7) and the cell's external positive terminal (1). The insulation disk (3) includes slots (3a) through which the current collection tabs extend. The insulation disc (3) prevents the cathode current collection tabs (7) and the cathode extension tab (2) from shorting to the internal active cathode and anode materials (8a and 8b). The cylindrical tube (4) acts as the main housing for the cell package.

During assembly, weld and crimp joints are used to connect both sets of current collector tabs (6) and (7) to both end caps (5) and (1), respectively, via the extension tab (2) and the integrated extension tab (5a) found in the negative end cap (5). Both end caps are welded to tube (4) to make the cylindrical cell. The negative end cap (5) contains both the cell's negative battery terminal as well as the cell's fill hole (discussed in greater detail below), both of which share the same internal volume and external space and are symmetrically centered in the cell. Negative end cap (5) also has an integrated extension tab (5a) for making an electrical connection between the anode current collection tabs (6) and the cell's external negative terminal located on the negative end cap (5). An insulation disk (3) with slots (3a) is also used at the anode to prevent shorting of the anode current collection tabs (6) and anode extension tab (5a).

An assembled cell incorporating the design features of FIG. 1 is shown in FIG. 2 in cross-section, where like elements are similarly labeled. Also represented are separator layers or separator membranes (8') between the electrodes (8a and 8b). Once assembled, the cell incorporates favorable features for both manufacturing and customer interface in a volumetrically efficient package. This allows for the vast majority of the inside of the cell to be used for active material, greatly improving the cell's energy storage capacity to volume ratio.

Individual components and features of the cell are described.

The positive end cap (1) includes an engineered vent score (10) and a nickel interface terminal (9), as illustrated in FIG. 3. The engineered vent score opens under a predetermined internal pressure, letting large amounts of gas and material exit the cell if necessary. The vent is an annular groove located near the periphery of the positive end cap, disposed between the end cap circumference and the nickel terminal. The groove can be located on the inner or outer face of the end cap, or both. In one or more embodiments, the groove is located on both the inner and outer faces of the end cap. The grooves may oppose one another or be offset from one another. The groove provides a thinned radial section in the end cap that is designed to rupture at a preselected pressure. The annular groove forms an arc on the end cap that is in the range of about 150 degrees to a full 360 degrees, or about 180 degrees to about 300 degrees. The actual arc length will depend on the size of the cell. The arc length can be selected so that the end cap hinges when ruptured and the ruptured end cap is not severed from the battery can, but also can be up to about a full 360 degree arch with no apparent hinge. A further advantage of the annular groove is that it serves to thermally insulate the terminal during welding of the end cap to the battery body. The groove is introduced by conventional methods, such as stamping, scoring or scribing and the like.

The nickel interface terminal (9) provides a low resistance, corrosion resistant battery terminal, as well as a weldable interface for connecting batteries together in packs. The nickel plate can range in thickness and typically has a thickness in the range of about 75 μm to about 125 μm. Thicker terminal plates are particularly well-suited for high power batteries. In one or more embodiments, the body of the cathode cap is aluminum and, for example, is the same aluminum alloy as the battery tube. In one or more embodiments, the cathode cap may be plated with a layer of nickel on its outside surface. The nickel interface terminal is then either resistance (spot) welded to the cathode cap to give a mechanically robust interface, re-flow soldered to the nickel plating layer to give an electrically robust interface between the two parts, or both. Other welding and soldering techniques may be used, for example, ultrasonic welding or electrically conductive adhesives. Suitable solder includes solder having a melting temperature above the maximum use temperature of the battery. This joining technique between the Ni terminal and the Al cathode cap is unique in the battery industry.

The pressure vent occupies a peripheral region of the end cap face and does not interfere with the location and securing of the nickel terminal. The nickel terminal cross-sectional area can be quite large and can occupy a significant portion of the end cap face. This serves to reduce cell impedance and to provide cell to cell weld-ability during pack assembly.

Figure 4B:
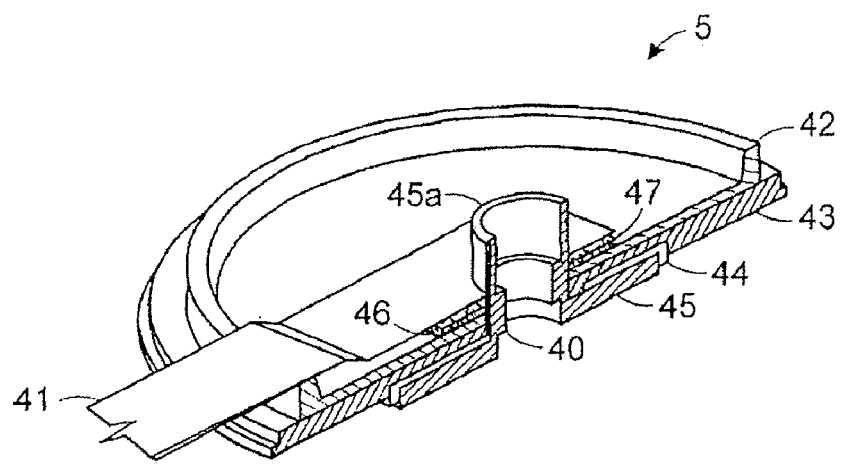
FIG. 4B shows a cross-sectional view of an assembled negative end cap.
Figure 4C:
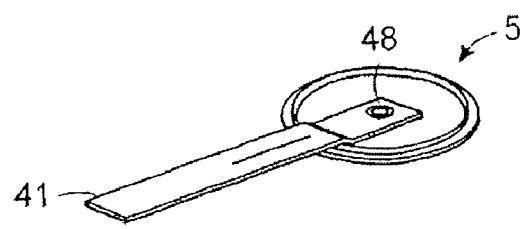
FIG. 4C shows a perspective view of an assembled negative end cap after riveting.

FIGS. 4A-4C depict a negative end cap (5) including a centrally located fill hole (40). The fill hole is used to activate the cell once assembled and is defined, at least in part, by a hollow bore rivet (45) which makes up the power terminal. Dual use of the central location of the negative end cap as both a fill hole and as a power terminal provides efficient use of space and does not interfere with battery operation. The fill hole (40) is centrally located in the end cap face. The centrally located fill hole provides a feed through inlet fittingly disposed within the hole and connecting to the interior of the cell. Electrolyte is introduced through this feed through inlet during activation.

The negative end cap is constructed by assembling the constituent components as illustrated in the exploded diagram of FIG. 4A. Upper gasket (44) is placed into end cap body (43), which may contain a depression for receiving the gasket. The hollow bore rivet serving as the power terminal (45) is assembled into upper gasket (44). The stem (45a) of rivet (45) extends through a central opening of both the upper gasket (44) and end cap body (43). The assembly is flipped over, and seal gasket (47) is inserted onto gasket (44) and placed onto body (43). Lower gasket (42), seal gasket (47), and rivet backing disc (46) are assembled and positioned as illustrated in FIG. 4A. Extension tab (41) is inserted onto the stem of rivet (45). The as-assembled components, prior to crimping are shown in FIG. 4B.

Rivet (45) may be Ni plated steel for both good corrosion resistance and good weldability, which serves as the power terminal for the cell. The flat head of rivet (45) extends over a portion of the external face of the end cap and the hollow stem (45a) extends into the interior of the cell. It also includes a fill hole through its center with an engineered ledge to help sealing, a symmetric shape, and a centralized rivet stem for sharing space and symmetry between the battery terminal and the fill hole. Extension tab (41) connects the power terminal (45) with the cell's internal active anode material. A lower gasket (42) protects the extension tab (41) from contacting the end cap body (43), which is at a different voltage potential. Body (43) is hermetically sealed to the battery tube (not shown) or the main body of the cell through any number of methods, including but not limited to the aforementioned methods of crimping and welding. Upper gasket (44) insulates the power terminal (45) from the end cap body (43), which are at different voltage potentials. Rivet backing disc (46) helps to create a robust press-rivet clamp force onto body (43). Seal gasket (47) helps to achieve a robust seal underneath the press-rivet.

The entire assembly may be crimped together by pressing and deforming the stem of rivet (45), as illustrated in FIG. 4C, squeezing all of the parts together to form press-rivet (48) and creating a good electrical contact between the extension tab (41) and the power terminal (45).

After the end caps have been welded to the cell's tube, the cell is activated by filling electrolyte through the hole in the power terminal (45). Turning now to FIGS. 5A and 5B, fill hole (40) is hermetically sealed by means of fill hole plug seal (50) (e.g., a high temp plastic seal) and fill hole plug (51), a deformable insert; e.g., a deformable metal insert. Fill hole plug seal (50) is pressed into the fill hole opening after the end cap has been sealed to the tube and the cell has been activated with electrolyte. The fill hole plug (51) is then pressed into this same fill hole, expanding, clamping and holding the seal (50) up against the engineered ledge of the rivet (45) and achieving a hermitic seal where the fill hole used to be.

The internally active material of the cell includes two electrodes, a cathode and an anode. One contributor to the impedance of a battery cell is the lack of current carrying paths between the active cell materials (anode and cathode) and the external cell terminals. It has been surprisingly discovered that overall cell impedance can be significantly lowered by using more current carriers, or "tabs", than conventional cylindrical (wound assembly) cells, whose designs call for one or two tabs per electrode. In one or more embodiments of the invention, a plurality of tabs are joined at a larger current collector on either side of the cell called an extension tab, which then makes the connection with each of the battery terminals of the cell. In one or more embodiments, the electrode can include about 4 to about 12 tabs, and for example, may include four tabs. In other embodiments, the electrode includes one tab per 200 cm$^2$ area of electrode. High power battery cells will require a higher density of tabs than low power cells.

Electrodes in this cell design uses several, e.g., four to twelve, current collecting tabs to conduct current out of each of the active material, e.g., cathode and anode, and into the battery terminals. FIG. 6A depicts an exemplary electrode sheet (60). The electrode sheet (60) includes an integral current collector substrate (66) and a layer of electroactive material (67) in electrical connection to the current collector substrate. Current collecting tabs (61), (62), (63), (64) extend from an edge portion (68) of the electrode.

The tabbed electrodes are then organized into an electrochemical cell. A separator sheet, e.g., two separator sheets, is interposed between the cathode and anode sheets such that the tabs of the cathode and anode are located at opposite sides of the assembly. The multilayer assembly is spirally wound to form a spiral electrochemical assembly, known as a "jellyroll." A jellyroll with extended tabs (6), (7) is illustrated in FIG. 1.

The tabs can be of different length, which reflect their distances from the jelly role center when wound. The length of the tabs may be adjusted before or after winding the jellyroll. In order to form the tabbed electrode, a portion of the electroactive material is removed from an edge of the electrode to create a clean surface for electrical contact as shown in FIG. 6B (not drawn to scale). The tabs are electrically connected, e.g., by welding, riveting, crimping or other similar technique, to an exposed portion of the electrode. An exemplary method for cleaning the contact surfaces and attaching the collector tabs is provided in co-pending U.S. Provisional Patent Application No. 60/799,894 entitled "Use of a Heated Base to Accelerate Removal of Coated Electrode in the Presence of a Solvent," filed on May 12, 2006, the contents of which are incorporated by reference. The tabs are then covered with a non-reactive tape (65), which covers the exposed metal tabs and prevents undesired chemical reactions with the cell chemicals. Tape (65) covers both sides of the electrode in the vicinity of the tabs. The tape covers that portion of the tab that lies over the electrode and may cover some or all of the underlying electrode that remains exposed, i.e., that is not covered by either active electrode layer or a current collecting tab. At least a portion of the tab that extends out from the electrode is not covered by tape.

Figure 7A:
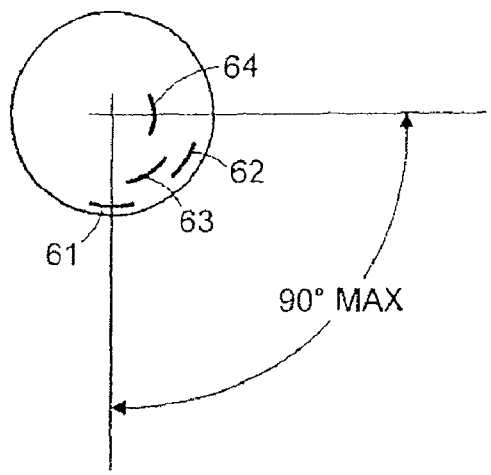
FIG. 7A shows a top view of a battery can indicating the exemplary location of collector tabs within a 90 degree quadrant.
Figure 7B:
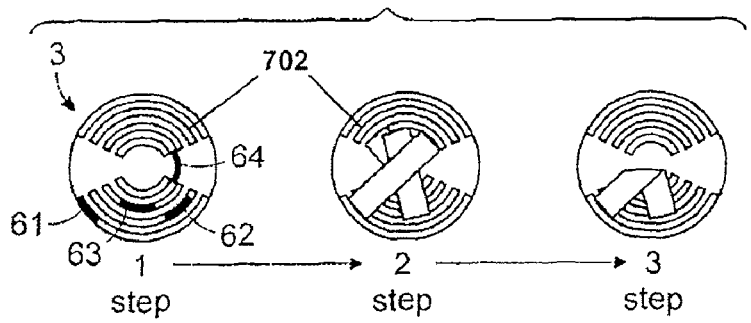
FIG. 7B depicts a series of views of the cell design according to one or more embodiments of the invention, and illustrates the location and bending of current collecting tabs.

In order to maximize the reduction in impedance of a cell through the addition of tabs, these four tabs can be positioned at equal intervals along each of the two electrode's lengths, e.g., as close to ⅛th, ⅜th, ⅝th, and ⅞th of the electrode length as possible, to thereby minimize the distance that current must travel through the electrode in order to reach the current collector tabs and the battery terminals. By minimizing the distance traveled within the electrode, internal resistance is minimized. Significant reductions in resistance are observed as the number of tabs is increased from one, in conventional batteries, to four or more, e.g., up to about 12, in accordance with one or more embodiments. As the number of tabs is increased beyond this, diminishing improvements in reducing resistance is observed. Other arrangements using more or less than 4 tabs are also contemplated. Once wound together, the jellyroll has the respective four (or other numbers) tabs sticking out of either end, as is illustrated in FIG. 1. These tabs are gathered together and connected to an external terminal, as illustrated in FIGS. 7A and 7B. A cell tabbing design can be provided to control and capture all of the tabs in a volumetrically efficient, manufacturable, and mechanically robust manner.

In one aspect of the tab design, the thickness of the materials that make up the jellyroll is controlled. Each of the materials (anode electrode, cathode electrode, and separator) may have a near uniform thickness. This allows one to model and reliably predict exactly how these materials will spirally wind into a jellyroll, including the number of turns and the finished diameter. This permits the accurate location of the tabs within the jellyroll.

In another aspect of tab design, the tab positions on the electrodes are selected before they are wound into the jellyroll. The tabs are placed along the length of each of the electrodes in positions that are both close to the ⅛$^{th}$, ⅜$^{th}$, ⅝$^{th}$, and ⅞$^{th}$ electrically optimized connections, e.g., for a 4-tab design, as well as positions that are predicted to align after the electrodes have been wound into the jellyroll. Tab positions are selected such that, for example, the four tabs of a single electrode are aligned with each other within a preselected region of the top face of the jellyroll. For example, the four tabs are position on a cathode sheet so that, on assembly into a jelly roll, the 4 tabs of the cathode sheet project from the face of the jelly roll in a selected region of the roll face. In one or more embodiments, the tabs are aligned within a 90 degree quadrant or larger, for example 150 degrees, as defined on the rolled end face of the spirally wound electrode assembly. The region, e.g., a 90 degree quadrant, is measured from the centerline of each tab, to account for the tab widths. In some embodiments, the tabs are located in an approximately 140 degree arc window. This alignment aids in the control and capture of each set of four (or more) tabs. Exemplary alignment of the tabs within a 90 degree quadrant is shown in FIG. 7A. By aligning the tabs within a selected region (e.g., a 90 degree quadrant), the costs for manufacturing the jellyroll cell can be reduced.

A third aspect of tab design is selection of the appropriate tab length and tab bending, as is illustrated in FIG. 7B. This is how the four tabs (61), (62), (63), (64) are captured and connected to the battery terminals. Step 1 of FIG. 7B shows the rolled top face of a battery and the location of all four tabs as they project from the face of the jellyroll. An insulation disc (3) is positioned over the end of the jellyroll, and the tabs are inserted through slots in the insulation disc. The insulation disc isolates each tab from the jellyroll. First all four tabs are bent towards the center axis (indicated by an "+" in FIG. 7B) of the jellyroll over an insulation disc (3). The result is a stack of tabs fanning in a region of up to about 140 degrees over of the face of the jellyroll. As noted previously, the tab length may vary. In one or more embodiments, the tab closest to the center axis, e.g., tab (64), is the shortest and the tab farthest from the center axis, e.g., tab (61), is the longest. The tab closest to the center of the jellyroll may be cut to a shorter length than the rest of the tabs, and each subsequent outwardly positioned tab is longer than the previous inner tab. The result is that when all four tabs are folded over, as illustrated in step 2 of FIG. 7, their ends align the same distance away from the axis of the jellyroll. Once the tabs are all lying flat, they are in the position that they will be in when the cell is finished. However, they must first be connected to the battery terminal's extension tab. In order to achieve this they are all bent together at about a 90° angle to the face of the jelly roll and parallel to and at the axis of the jellyroll, as illustrated in step 3 of FIG. 7. This consolidates the four tabs into one entity to which the battery terminal's extension tab can easily be welded.

Figure 8:
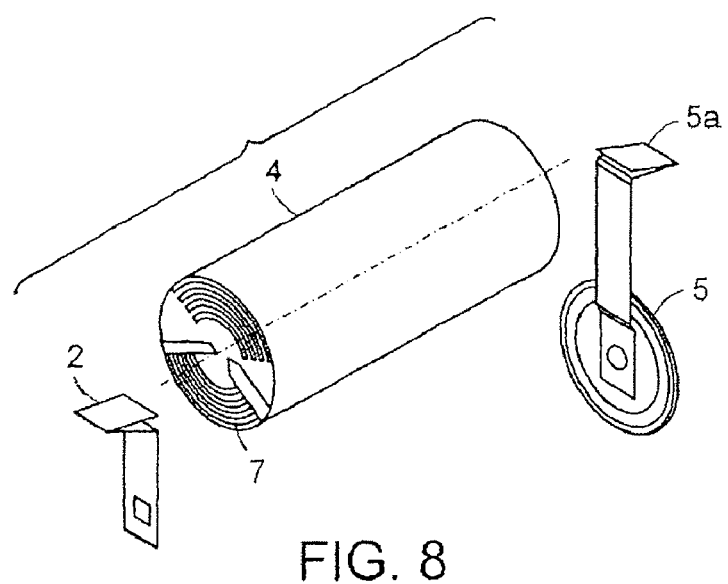
FIG. 8 depicts the attachment of current extension tabs to the respective terminals.

The fourth aspect of tab design is the joining of the battery extension tabs to the four electrode tabs. In one design this is achieved through ultrasonic welding, but resistance welding or other metal joining technique could be adopted just as easily. In one embodiment, the extension tabs are first folded in a way that allows a welder to pinch them over the four electrode tabs, however, other means of joining the components are contemplated. The thicker extension tab protects the thinner electrode tabs from being damaged by the welder. The joining is achieved in a manner that allows the four electrode tabs as well as the extension tabs to be both folded back down flat, achieving a very volumetrically efficient cell design. Once the tabs have been welded and folded flat, the cell's end caps are welded to the tube, resulting in very little space used for managing tabs that could otherwise be used for additional cell energy capacity. This is illustrated in FIG. 8.

A fifth aspect of tab design is the location of the tabs along the spiral assembly to reduce the induced magnetic field in pulsed power applications. It has been discovered that inductance internal to a battery used in a system which interrupts the current flow from the battery many times a second, e.g., pulsed applications, can increase power losses in the system, thereby resulting in higher internal device heating and decreased battery runtimes. The battery consists of conductors, e.g., electrode sheets that carry current between the internal energy storage medium and the external loads. The inductance of a battery can be a result of the dimensions, shape and/or number of the conductors through which the current in the battery flow. Their geometry influences the electromagnetic fields around the conductors caused by changing current flow. The larger the electromagnetic energy induced around the conductors, the higher the inductance that can be measured through the conductors. Conversely, the more inductance that a conductor exhibits, the more electromagnetic energy is stored around them as it passes currents to and from the battery to a load such as a motor.

Figure 9:
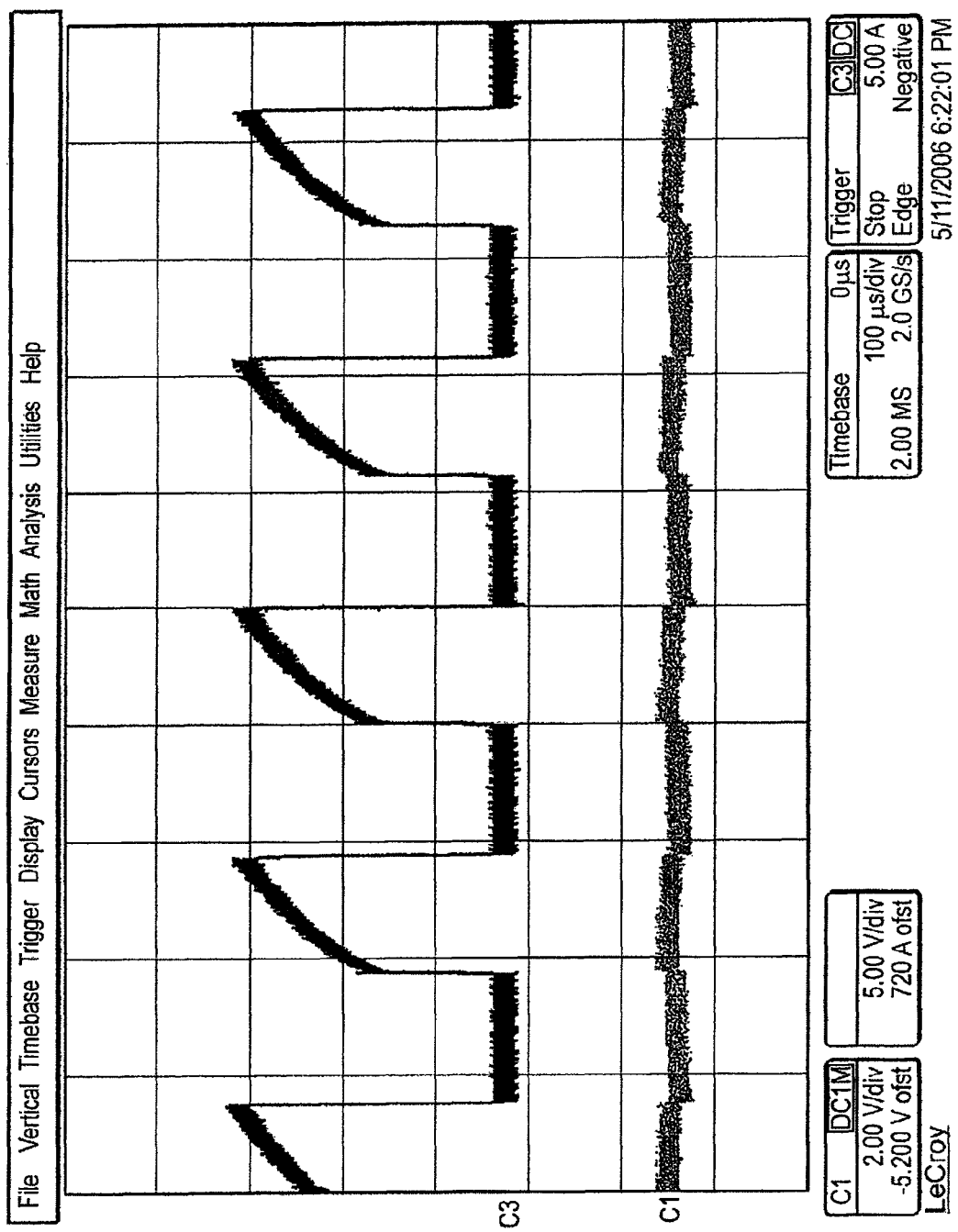
FIG. 9 is a plot of current vs. time in a motor that is pulsed about 4000 times/sec.

In an application such as variable speed drill or other tool, the motor is pulsed many times a second. This means that current is switched into the motor, by use of an electronic switch, and then switched off. FIG. 9 shows how the current is pulsed into an example motor (e.g., a power tool) about four thousand times a second. The trace representing the current, goes up, and then rapidly goes back down. The motor controller in the power tool can switch on and off the current several thousand times a second. The magnetic field around the conductors that carry the current to the motor exists only during the time that the current flows. It goes to zero when the current is zero. The problem is that this magnetic energy can be transformed to other types of energy such as heat.

When the motor controller attempts to turn off the current from the battery, the magnetic field around the conductors cause the current to continue to flow, even though the controller's switch is opened. This current is typically absorbed in a dissipative element, such as a resistor, and dissipated as heat. A circuit designed to absorb this stray magnetic field energy is often called a snubber, and is commonly found in power circuits that rapidly interrupt current flow from energy sources. The higher the inductance of the power circuit including that of the energy source, the more energy needs to be dissipated by the snubber. This dissipated energy can be evidenced by heat built up in the motor speed controller circuitry. If no snubber were designed into the circuitry, the energy would be dissipated elsewhere, such as in the other power switching circuit elements. In any case the energy will be dissipated and turned to heat inside the load system's switching controller. Another factor that determines how much energy is dissipated in the controller is how many times the current is interrupted by it. The more times this stored magnetic energy is transferred from magnetic energy to heat energy, the higher the temperatures will be seen inside the motor controller circuitry.

Therefore, batteries with lower inductance will result in less heat dissipated by a switching controller, which pulses current from the battery to a motor or other load. Such applications include, but are not limited to variable speed power tools, shavers, remote controlled model vehicles, electric propulsion systems for human and material transport, uninterruptible power systems, and any other device employing switching power supply devices to control the flow of current from an energy source, namely a battery.

It has been discovered that appropriate placement of a plurality of tabs on each electrode (for example, by placing 4 to 12 tabs), rather than placing a single tab at one end of each electrode, can significantly reduce resistance and inductance of the cell. In one or more embodiments, the collector tabs are positioned so that adjacent induced current loops flow in opposing directions. The tabs may be displaced a set distance from the leading edge of the electrode sheet and, thereafter, are spaced evenly along the length of the electrode sheet. In some embodiments, the electrode includes 4-12 conductor tabs. The two electrodes may have a different number of tabs. For example, one electrode may have 4 tabs, and the other electrode may have 2 tabs. As is described in greater detail below with reference to FIGS. 11A and 11B, the displacement of the first tab a distance from the leading edges of the electrode provides desirable reduction in induced current and hence reduced the induced magnetic field.

Figure 10A:
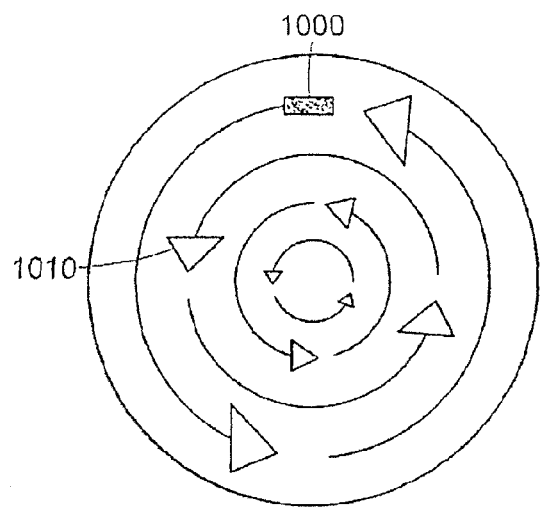
FIG. 10A illustrates the tab position and current flow in an exemplary cylindrically wound battery, as viewed from the rolled end face of the spirally wound electrode.
Figure 10B:
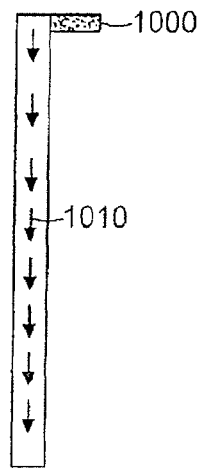
FIG. 10B is a plan view of an unrolled electrode of the cylindrically wound battery shown in FIG. 10A.

FIGS. 10A and 10B illustrate tab position and current flow in a conventional wound cell. FIG. 10A views the rolled electrode from the rolled edge. FIG. 10B is a plan view of an unrolled electrode of the conventional cylindrically wound cell. In this wound cell, a single tab 1000 is placed at the end of an electrode, and current flows in the direction of 1010. When the cell is charged or discharged, current flow along the length of the electrode, leaving tab 1000 and traveling down the length of the electrode. When the electrode is rolled, as shown in FIG. 10A, current along the electrode flows in the counter-clockwise direction 1010. Therefore, the electrode acts as a coil, and the current that flows in the coil can induce a magnetic field along the along the axis of the coil, according to the well-known "right hand rule." This can result in a relatively large inductance in the wound cell. When anode and cathode sheets are wound into a cylindrical jelly roll according to this conventional arrangement, two coils are created.

Figure 11A:
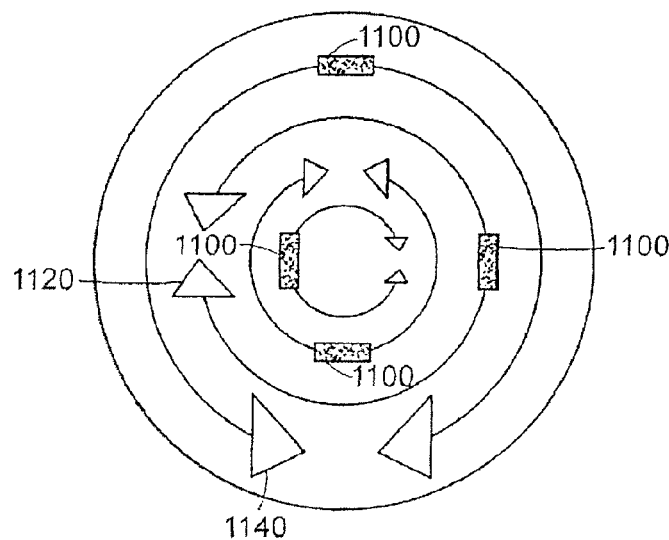
FIG. 11A illustrates the tab position and current flow in another exemplary cylindrically wound battery, as viewed from the rolled end face of the spirally wound electrode.
Figure 11B:
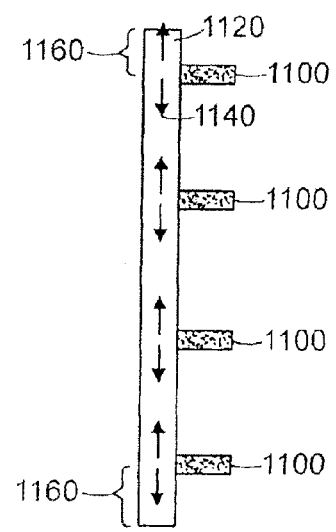
FIG. 11B is a plan view of an unrolled electrode of the cylindrically wound battery shown in FIG. 11A.

FIGS. 11A and 11B illustrate tab position and current flow in a wound battery according to one or more embodiments of the invention. FIG. 11A views the rolled electrode from the rolled edge. FIG. 11B is a plan view of an unrolled electrode of the wound battery. As shown, multiple tabs 1100 can be positioned along the electrode, and current flows in both directions (counter-clockwise 1140 and clockwise 1120, when the electrode is rolled) depending on the position relative to the nearest tab. In some embodiments, tabs 1100 may be spaced uniformly apart along the length of the electrode. Tabs 1100 can also be displaced a distance 1160 from the leading edges of the electrode. Distance 1160 is selected to be about one-half the spacing between adjacent tabs. These arrangements allow induced current flows (e.g., loops) to oppose one another in different layers of the jelly roll. As a result, the induced magnetic fields of the current flows can substantially cancel each other out. The locations of the plurality of conducting tabs can be selected such that net magnetic fields caused by induced currents in the battery is reduce by at least 80% compared to having only a single conducting tab located at a leading edge of the anode sheet or the cathode sheet. In this manner, the inductance of the battery can be made significantly lower.

In one embodiment, four tabs can provide significantly reduced inductance, as compared to one tab located at the end of the electrode sheet. However, increasing the number of tabs to, for example, more than 12, may result in a very limited inductance reduction and higher manufacturing costs. In some embodiments, the design can use fewer than four tabs. One tab in the middle of the electrode can serve a similar purpose and would result in a cell inductance lower than if the electrode had one tab at the end. In some embodiments, an electrode may have one tab per 50 $cm^2$ to 400 $cm^2$ area of the electrode sheet.

Several exemplary cylindrical-wound cells are described as follows. These cells were 26 mm in diameter and 65 mm long, so-called "26650-sized" cells. These cells were made with both four and eight tabs, evenly spaced along the length of the electrode. For comparison, commercially-available cylindrical-wound cells of similar capacity were obtained. All cells had their inductance measured using two methods: (1) Fluke PM6306 RCL meter; and (2) Solartron 1250 frequency response analyzer. Using the Solartron frequency response analyzer, it was shown that the cells with four tabs had an average inductance of 0.025 microH. The cells with eight tabs had an average inductance of 0.028 microH. In contrast, the commercially-available high-power cells with only one tab had an average inductance more than ten times larger (see Table 1 below).

inductance), the higher this voltage will rise. The multiplication of this voltage and the current after the switch has turned off yields the exact energy being dissipated as useless heat. So, a higher voltage indicates a higher energy dissipation.

Figure 12:
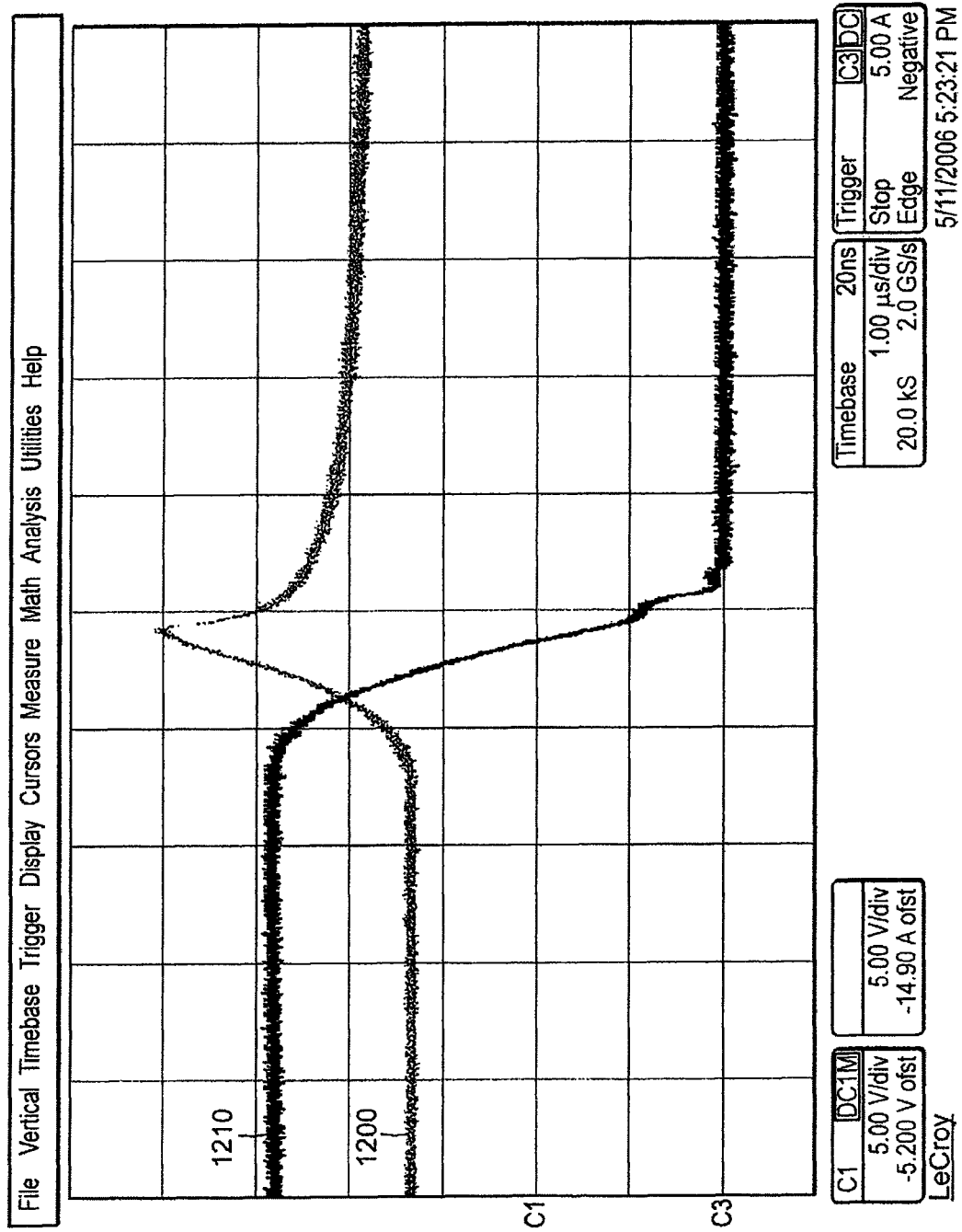
FIG. 12 shows a high-inductance battery's voltage and current waveforms.
Figure 13:
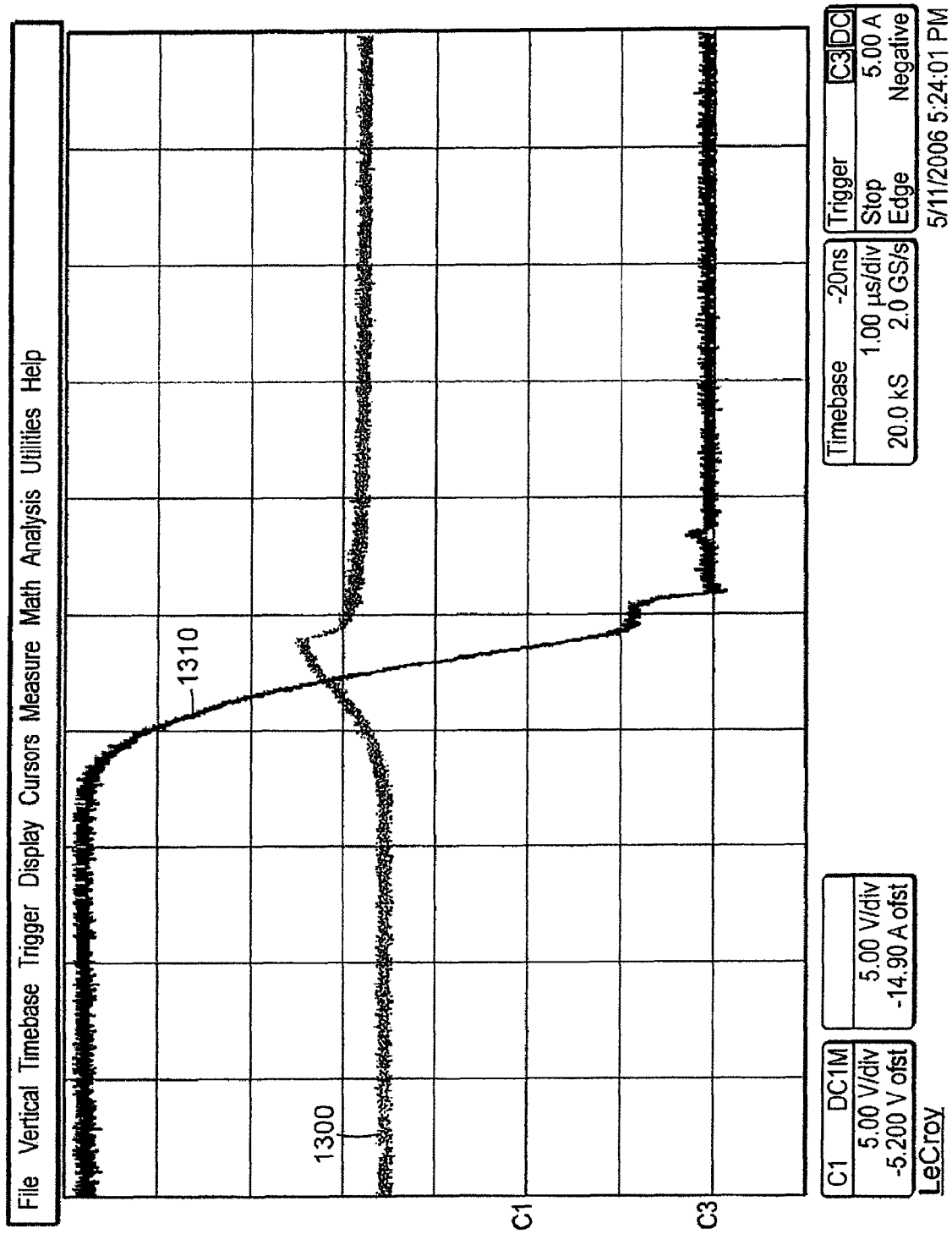
FIG. 13 shows a low-inductance battery's voltage and current waveforms.

In FIG. 13, a low-inductance battery containing four or eight appropriately located tabs yields a much smaller voltage spike 1300 as the current 1310 falls to zero. This lower spike indicates a smaller amount of energy being dissipated inside the power controller circuitry than in the case of the higher inductance battery used in the experiment illustrated in FIG. 12.

As discussed in connection with FIG. 7A, positions of tabs can be selected so that the tabs are aligned within a specific region (e.g., a 90 degree quadrant) on a face of the wound cell. Selecting the positions of the tabs so that the tabs are evenly spaced along the length of the electrode can further reduce the resistance and inductance of the wound cell.

As shown in FIGS. 1 and 7B, insulation disc (3) can be used to prevent current collecting tabs (61), (62), (63), (64) from contacting the electrode of the opposite polarity thereby avoiding a short circuit. Insulation disc (3) can be a polymeric disc made from polyolefin, polybutylene, polyester, phenolformaldehyde resin, and fluoropolymers such as perfluoroalkoxy, or from other types of electrically insulating material. Insulator (3) can have a number of slots (702) that allow current collecting tabs (61), (62), (63), (64) to pass through. Because the relative position of the current collecting tabs (61), (62), (63), (64) after the spiral winding of the jelly roll cell may vary significantly due to slight variations in the thickness of the electrode sheets, the slots (702) may be of varying length in order to accommodate (i.e., allow the passing through of) the tabs. In some embodiments, as shown in FIGS. 1 and 7B, arc shaped slots (702) having a span of about 90-120 degrees may be used on insulation disc (3). The positions of tabs can be selected so that the tabs are aligned with one of the slots on the insulator disk. The arc length, e.g.,

TABLE 1

| Cell Type cell_ID | Instrument: Fluke PM6306 RCL meter: 2.0 V AC excitation: zero trim set at each frequency cell inductance (microH) at freqency, kHz (2.0 V AC excitation) | | | | | | Inductance (microH) Instrument: Solartron 1250 FRA. 5 mV | no. of tabs |
|---|---|---|---|---|---|---|---|---|
| All cells: TX-C-1 26650 s | 1 | 4 | 10 | 25 | 50 | 100 | | |
| 4a5 | nm | 0.03 | 0.05 | 0.01 | 0.02 | 0.03 | | 4 |
| 3a1 | nm | 0.04 | 0.06 | 0.05 | 0.03 | 0.01 | | 4 |
| 3a2 | 0.02 | 0.06 | 0.04 | 0.02 | 0.02 | 0.02 | | 4 |
| 3a3 | nm | 0.06 | 0.04 | 0.03 | 0.03 | 0.03 | | 4 |
| 4a1 | nm | 0.06 | 0.05 | 0.02 | 0.03 | 0.02 | 0.024 | 4 |
| 4a4 | nm | 0.06 | 0.05 | 0.04 | 0.03 | 0.03 | 0.026 | 4 |
| 4b6 | nm | 0.06 | 0.05 | 0.02 | 0.03 | 0.02 | 0.029 | 8 |
| 4b4 | nm | 0.07 | 0.05 | 0.04 | 0.03 | 0.03 | 0.026 | 8 |
| Sony 18650VT | | 0.50 | | | | | 0.68 | 0.433 | 1 |
| Sanyo 18650 LCO regular | | 0.45 | | | | | 0.61 | 0.330 | 1 |
| Sony 18650VT | | 0.36 | | | | | 0.63 | 0.336 | 1 |
| Valence 18650 IFR13N5 | | 0.48 | | | | | 0.65 | 0.385 | 1 |

FIGS. 12 and 13 illustrate how two different batteries with different inductances can demonstrate different energy dissipation levels within an application. FIG. 12 shows a high-inductance battery's voltage 1200 and current 1210 waveforms. Notice that when the current trace 1210 starts to go down, at the point where the controller switches it off, that the voltage 1200 goes up. The rising voltage is a measure of the electromotive force that the magnetic field is pushing on the controller's circuitry in order to force its dissipation. The more energy there is to dissipate (and therefore, the higher the about 90-120 degrees, allows one to locate the tabs within a selected angular region of the end face of the jelly roll, while accommodating for any slight variations in thickness of the electrode layer that may cause variation in tab location.

In one or more embodiments, an electrode sheet includes 5 or higher, e.g., 8 or more, tabs. As the number of current collecting tabs increases, it becomes increasingly difficult to locate the tabs along the length of the electrode sheet so that they are located in a narrow arc along the end face of the jelly roll after winding. For example, slight variations in electrode layer thickness and the desire to locate the tabs for optimal current carrying properties may result in tab locations spanning the full annular geometry of the end face of the jelly roll. The more spaced-apart tabs require more slots (702) and at least one slot having a greater angular span on insulation disc (3). Although annular ring shaped slots or other designs can be used, it can be difficult to manufacture and/or to assemble such insulators. The larger arc widths, coupled with the greater number of slots required, can result in insulating end caps in which the slots are spaced apart from one another by narrow insulating bridges, resulting in mechanical weakening, distortion and increased likelihood of shorting.

According one or more embodiments of the invention, a tab insulator can include two or more coaxially positioned annular insulating members, each insulating annular member containing at least one slot for accommodating tabs. The relative angular position of the insulating members can vary and can be adjusted during assembly of the battery cell to easily accommodate a larger number (e.g., 4 or more) of current collecting tabs. In one or more embodiments, the insulating annular members include slots having large, e.g., greater than 120 degrees, or ranging up to about 180 degrees, angular spread, and insulating annular members can be arranged as nested annular rings. In one or more embodiments, the nested annular rings are adjusted so that the arc-shaped slots are positioned to accommodate 4 or more tabs.

Figure 14:
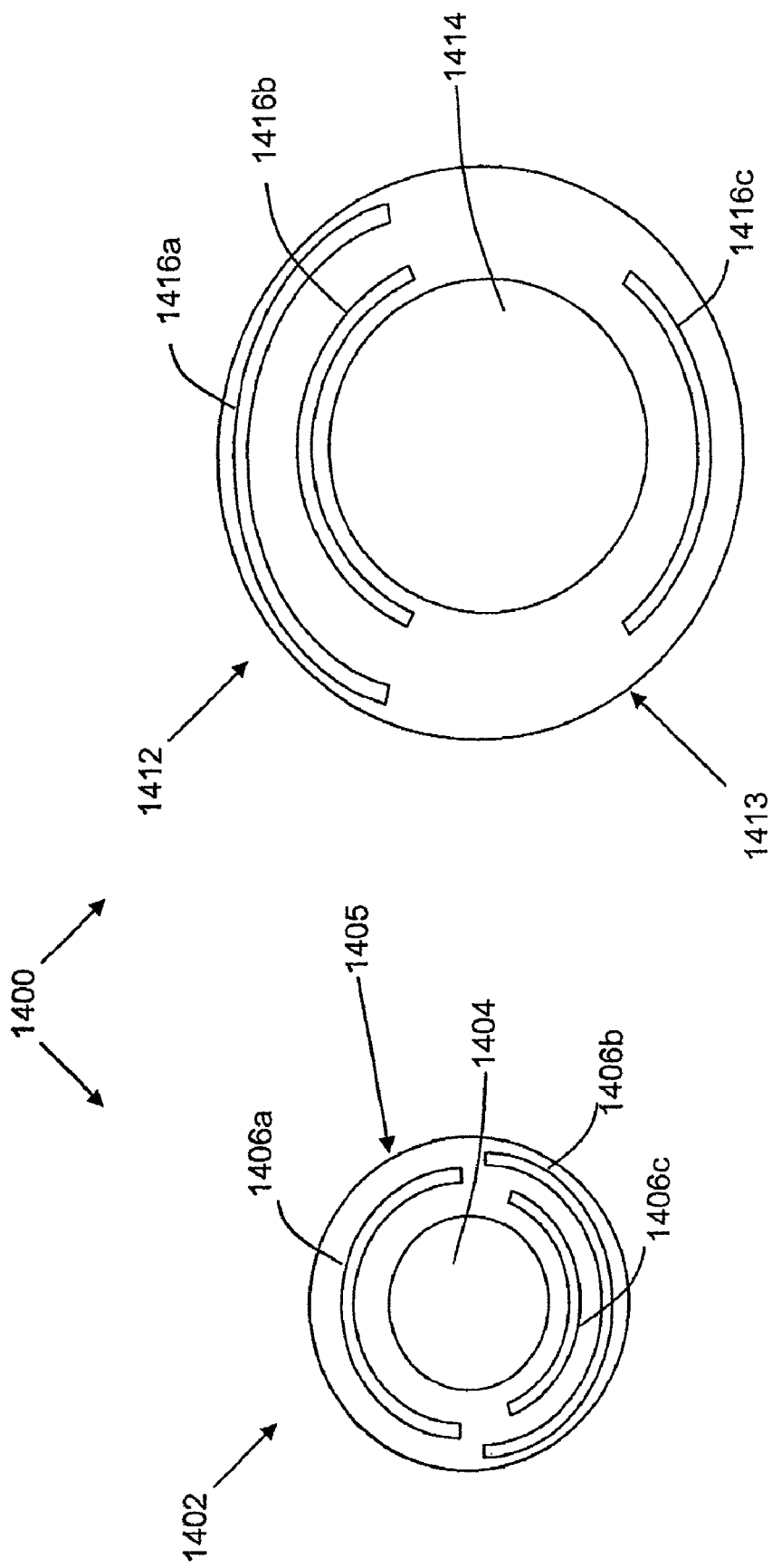
FIG. 14 depicts a tab insulator having two members according to one or more embodiments of the invention.

FIG. 14 is a plan view of a tab insulator according to one or more embodiments of the invention. The insulator is shown with 6 slots, however, it is understood that this is for the purpose of illustration only and any number of slots may be used. The number of slots on each insulating member may be the same or different and can typically range from at little as four, to eight or more. As shown, a tab insulator (1400) can have a first insulation member (1402) and a second insulation member (1412). The first and second insulation members are of different dimensions, so that the smaller member can be nested with the larger insulating member. Insulation member (1402), which is smaller in size than insulation member (1412), can have a number of arc shaped slots (1406a), (1406b), and (1406c) disposed thereon to accommodate current collecting tabs (not shown) of the battery cell. Similarly, insulation member (1412) can also have a number of arc shaped slots (1416a), (1416b), and (1416c) to accommodate additional current collecting tabs (not shown). Members (1402) and (1412) can each be made from an electrically insulating material such as polyolefin, polybutylene, polyester, phenol-formaldehyde resin, and fluoropolymers such as perfluoroalkoxy, or any other suitable insulating material. Insulator (1400) can be manufactured using die cutting, injection molding, or any other suitable techniques.

Each of the six slots (1406a), (1406b), (1406c), (1416a), (1416b), and (1416c) can be used to accommodate one or more current collecting tabs (not shown). In addition, insulation member (1412) can also provide insulation for one or more tabs located along an outer edge (1413) of member (1412), and insulation member (1402) can also provide insulation for one or more tabs located along an outer edge (1405) of member (1402). Insulator (1400) can therefore accommodate a plurality, e.g., 6, 7, 8 or more current collecting tabs. Insulation member (1412) can have an opening (1414) at its center. For use in a battery, the two insulation members (1402), (1412) can be disposed concentrically, so that the concentrically positioned inner and outer insulating members are aligned with tabs (not shown) that pass through slots (1406a), (1406b), and (1406c) on insulation member (1402) and slots (1416a), (1416b) and (1416c) on insulation member (1412). Tabs can also pass through opening (1414) of insulation member (1412). Insulation member (1402) may also have an opening (1404) at the center that would allow a stem of the battery cell (e.g., stem (45a) shown in FIG. 4B) to pass through.

Slots can be, for example, approximately 0.5-2.0 mm wide, and have angular spans of approximately 120-180 degrees. In a cylindrical cell of approximately 32 mm diameter, the inner member can, for example, have an inner diameter of 3-10 mm and an outer diameter of 18-25 mm. The outer member can, for example have an inner diameter of 16-25 mm and an outer diameter of 30-31.5 mm. It can be useful to make the inner diameter of the outer member smaller than the outer diameter of the inner member, however they need not overlap. First and second members need not be perfectly circular. In one or more embodiments, slots with increasing radii from the axis are located at opposite regions of the annular member. Thus, slot (1416a) and (1416b), which are located the furthest and second furthest (largest and second largest radii) from a central axis, are located at opposing regions of the second annular member. The opposing location maximizes the insulating region between adjacent slots and helps to increase mechanical stability and insulating capability.

Figure 15:
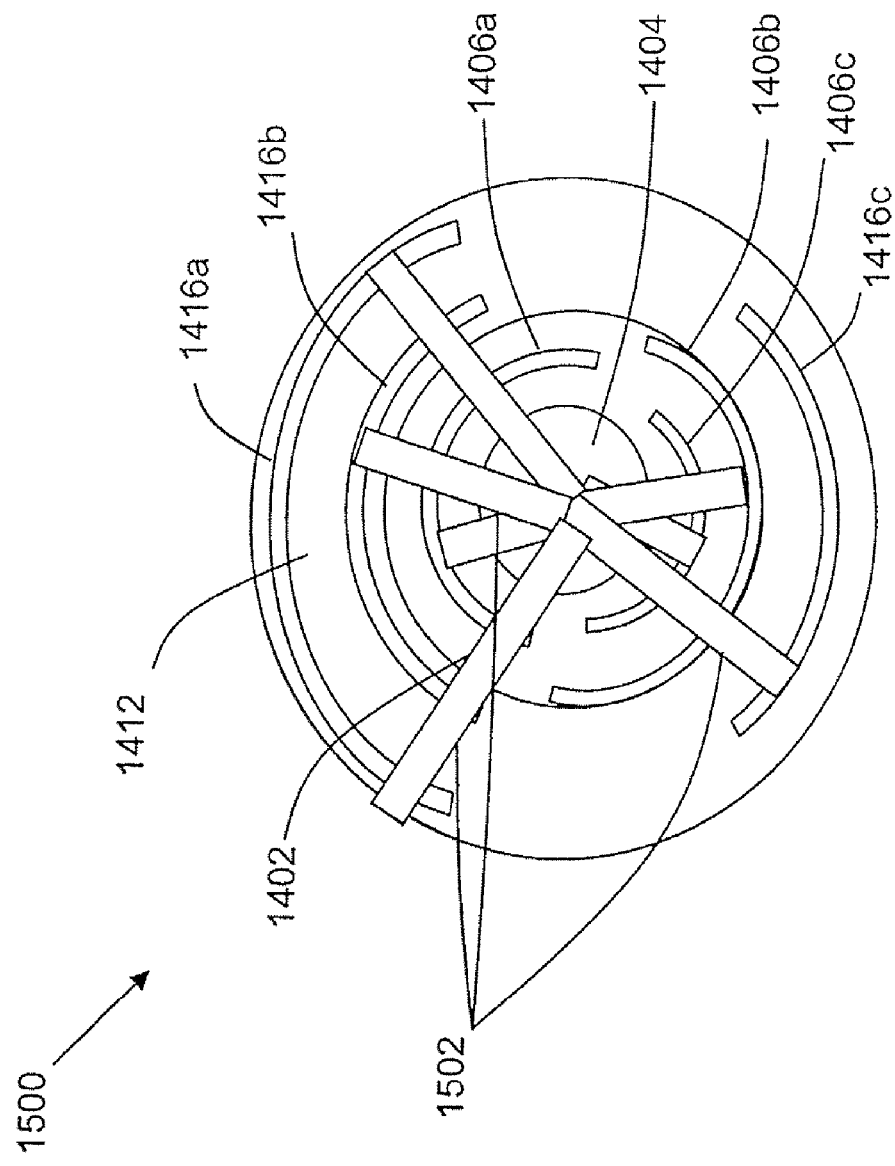
FIG. 15 is a top view of the insulator shown in FIG. 14, in which the two members are concentrically disposed.

FIG. 15 is a top view of an assembled insulator (1400) shown in FIG. 14. In FIG. 14, the two insulation members (1402), (1412) are disposed concentrically, so that smaller insulation member (1402) with slots (1406a), (1406b), and (1406c) are located within opening (1414) of the larger second insulation member (1412). Current collecting tabs (1502) of the battery cell can therefore pass through slots (1406a), (1406b), (1406c), (1416a), (1416b), and (1416c) and can be bent toward the center of the battery cell as shown. Note that the current collecting tabs are not constrained to be within a 90-120 degree region.

One feature of this insulator end cap is that the angular position of insulation members (1402) and (1412) with respect to one another can be adjusted during the assembly of the battery cell to accommodate significantly varying tab positions. For example, for tab insulator (1400), after the spiral winding of the electrode sheets of the battery cell, tabs that are located close to the center of the battery cell can be fitted through slots (1406a), (1406b), and (1406c) on insulation member (1402). At this point, the angular position of second insulation member (1412) may be adjusted so that tabs that are located away from the center of the battery cell can be easily fitted through slots (1416a), (1416b), and (1416c) on insulation member (1412). In one embodiment, one or more of the slots (1406a), (1406b), (1406c), (1416a), (1416b), and (1416c) have angular spans of approximately 120 degrees, which can accommodate a large variation of relative tab positions.

Figure 16:
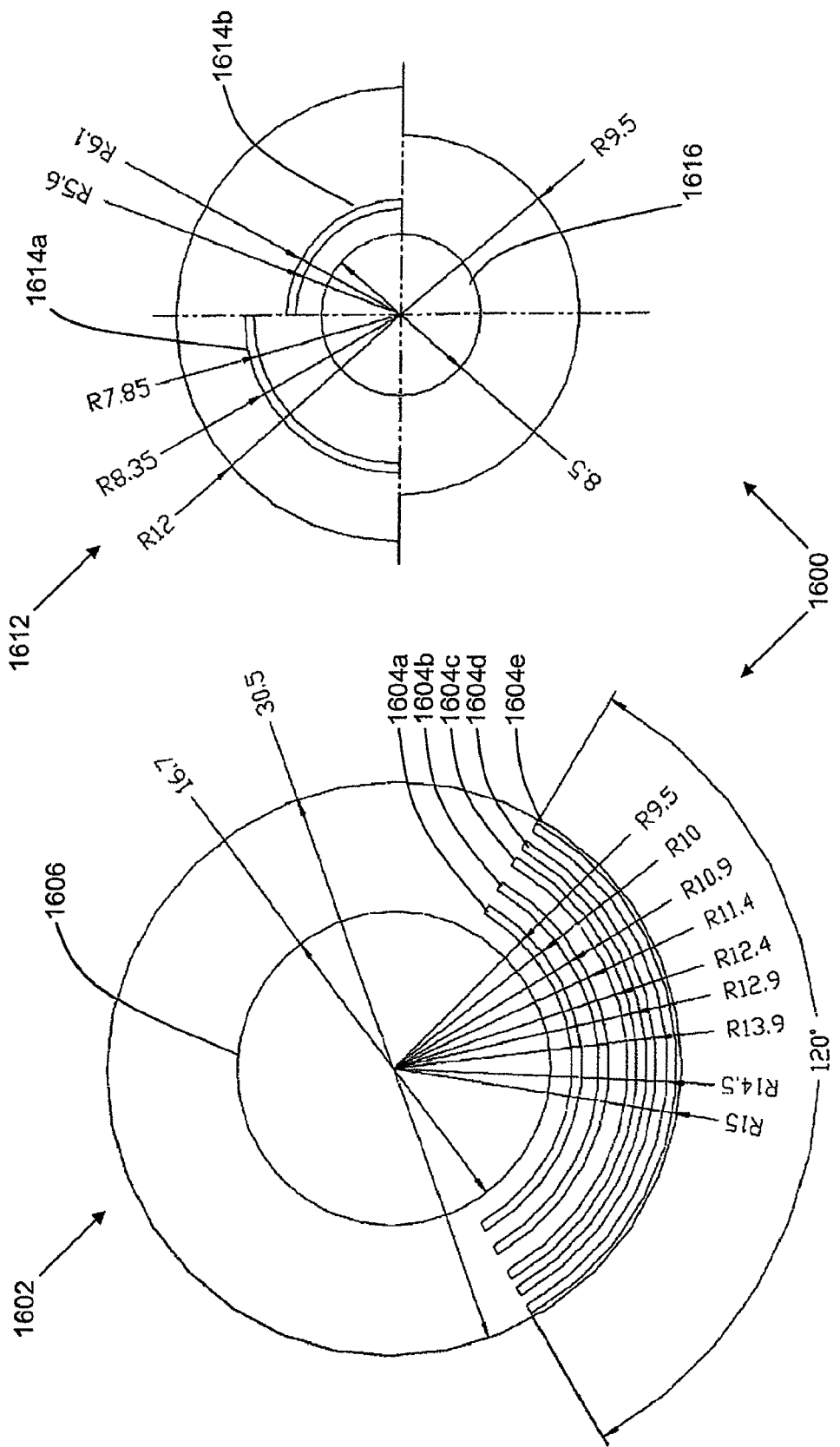
FIG. 16 depicts a tab insulator design according to another embodiment of the present invention.

FIG. 16 depicts an insulator design according to another embodiment of the invention. As shown, insulator (1600) can include insulation members 1602 and 1612. Member 1602 can have slots (1604a), (1604b), (1604c), (1604d), (1604e), and member (1612) can have slots (1614a) and (1614b). Insulation member (1602) can, for example, have a diameter of approximately 30-31.5 mm, and an opening (1606) having a diameter of approximately 28-25 mm. Slots (1604a), (1604b), (1604c), (1604d), (1604e) can be, for example, approximately 0.5 mm wide, and have angular spans of approximately 120 degrees. The radii of slots (1604a), (1604b), (1604c), (1604d), (1604e) can be, for example, approximately 9.5-10 mm, 10.9-11.4 mm, 12.4-12.9 mm, 13.4-13.9 mm, 14.5-15 mm, respectively. The radial position of each slot is intended to coincide with the radial position of its respective tab. In some embodiments, tabs can be evenly spaced on each electrode, minimizing impedance and current density gradients to most efficiently utilize the electrode. In this case, the approximate radial locations of the tabs after winding can be predicted, and the slots can be positioned accordingly to accommodate the tab. The shape of each slot need not be perfectly circular and may, for example, be shaped as a portion of a spiral, so that the radius of the arcs may change over the length of the arc.

Member (1612) need not be perfectly circular. For example, the lower half of member (1612) may have a radius of approximately 9.5 mm and the upper half may have a radius of approximately 12 mm. With this design, when member (1612) is aligned concentrically with member (1602), a tab can pass through members (1612), (1602) and rest against the outer edge of the lower half of member (1612). Slots (1614a), (1614b) can also be approximately 0.5 mm wide and can have angular spans of, for example, approximately 90 degrees. Angular spans of the slots can be designed based on the predicted angular variation of the tab positions relative to one another. If the inner tabs are predicted to have a smaller variation in position relative to the inner most tab after winding than the outer tabs, the angular spans of the inner slots may be made smaller than the angular spans of the outer slots. Slots (1614a), (1614b) can be located, for example, approximately 5.6-6.1 mm and 7.85-8.35 mm from the center respectively. Slots (1614a), (1614b) need not be located in the same quadrant of insulating member (1612). Tab insulator (1600) can be used to accommodate 7 or more current collecting tabs.

Figure 17:
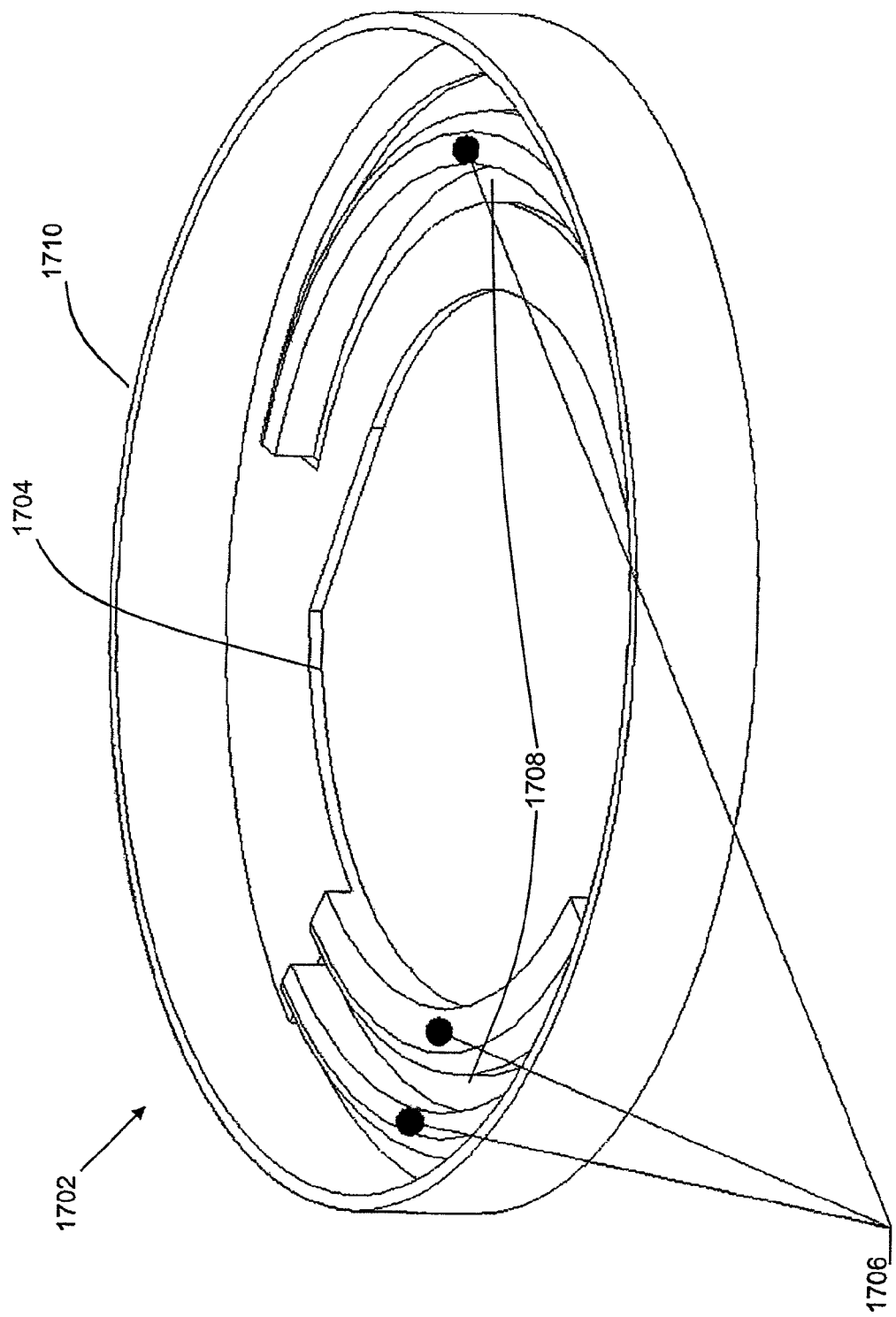
FIG. 17 is a perspective view of a member of a tab insulator having tab risers and a cylindrical side wall.

FIG. 17 is a perspective view of an outer member (1702) of an insulator. Member (1702) can have slots (1708) and an opening (1704) at the center. In addition, member (1702) can have three-dimensional (3D) features such as one or more rib shaped protrusions (1706), which can be referred to as "tab risers," and a cylindrical vertical side wall (1710). Tab risers (1706) can be, for example, arc shaped and located alongside slots (1708). Tab risers (1706) protrude from the outer surface of member (1702) to facilitate tab bending. Cylindrical side wall (1710) can extend from the perimeter of member (1702) to protect the cell can from being contacted by a current collecting tab. When assembled, the cylindrical side wall is positioned away from the jelly roll. These 3D features can be made using injection molding or other suitable manufacturing techniques.

FIG. 18 is a perspective view of an insulator (1800) having a larger (outer) member (1802) and a smaller (inner) member (1812). Members (1802) and (1812) can have slots (1804) disposed thereon. Member (1802) can have a cylindrical side wall (1806). One or both of members (1802) and (1812) can also have additional 3D features (not shown) that ensure that the two members (1802) and (1812) remain concentric to one another after assembly into a battery cell. For example, an arc shaped ridge (not shown) can be located along side slot 1804a on inner member (1812), so that when member (1802) is lowered, the ridge on the inner member (1812) coincides with and rests against the edge (1816) of the opening (1814) of outer member (1802). In this manner, inner member (1812) can be nested with outer member (1802) and therefore can stay concentric with outer member (1802) after assembly.

Although examples of tab insulators described above have only one or two members, embodiments of the present invention include tab insulators having three or more members. These members can have slots to accommodate tabs and can be disposed concentrically. The members can also be flexibly adjusted in terms of their angular orientation during assembly of the battery cell to accommodate varying positions of current collecting tabs. In one or more embodiments, insulators having 2 or more members can be used to accommodate more than 7 current collecting tabs.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

The invention claimed is:

1. An electrochemical cell, comprising:
an assembly comprising an anode sheet and a cathode sheet separated by separator membranes, the cathode sheet comprising a first electroactive layer on a first current collector, and the anode sheet comprising a second electroactive layer on a second current collector, the assembly having a side wall and opposing end faces;
a plurality of conducting tabs that extend from at least one of the anode sheet and the cathode sheet, the plurality of conducting tabs extending from an end face of the assembly and in electrical communication with at least one of the first current collector and the second current collector; and
a first tab insulator having separate outer and inner members, each of the outer and inner members having at least one slot that allows one or more of the plurality of conducting tabs to pass through,
wherein the inner and outer members are adjustable so that an angular position of the at least one slot of the inner member can be moved with respect to the at least one slot of the outer member.

2. The electrochemical cell of claim 1, wherein the one or more slots are arc shaped.

3. The electrochemical cell of claim 2, wherein at least one of the one or more slots have an angular span of about 120-180 degrees.

4. The electrochemical cell of claim 2, wherein at least one of the one or more slots have an angular span of about 90 degrees.

5. The electrochemical cell of claim 1, wherein the outer member has a cylindrical side wall perpendicular to a face of the outer member.

6. The electrochemical cell of claim 1, wherein at least one of the outer member and the inner member has a rib shaped protrusion for facilitating bending of at least one of the plurality of conducting tabs.

7. The electrochemical cell of claim 1, wherein at least one of the outer member and the inner member has one or more ridges for nesting the inner member with the outer member.

8. The electrochemical cell of claim 1, wherein the plurality of conducting tabs comprise 4 to 12 tabs.

9. The electrochemical cell of claim 1, wherein the first current collector is in electrical communication with a first plurality of conducting tabs that extend from the cathode sheet, and the second current collector is in electrical communication with a second plurality of conducting tabs that extend from the anode sheet, wherein the first plurality of conducting tabs and the second plurality of conducting tabs extend from opposing end faces of the assembly, and wherein the assembly is a spirally wound assembly.

10. The electrochemical cell of claim 9, further comprising a second tab insulator, the first tab insulator and the second tab insulator disposed on opposing end faces of the spirally wound assembly.

11. The electrochemical cell of claim 1, wherein at least one of the inner and outer members has at least two slots located on opposite sides with respect to the center of the at least one of the inner and outer members.

12. A tab insulator for use in a battery cell, comprising:
at least one outer member and at least one separate inner member that are nested together, each of the at least one outer member and at least one inner member having at least one slot that is operable to allow one or more conducting tabs of the battery cell to pass through,
wherein the inner and outer members are adjustable so that an angular orientation of the at least one slot of the inner member can be moved with respect to the at least one slot of the outer member.

13. The tab insulator of claim 12, wherein at least one of the slots has an angular span of about 120-180 degrees.

14. The tab insulator of claim 12, wherein at least one of the slots has an angular span of about 90 degrees.

15. The tab insulator of claim 12, wherein the outer member has a cylindrical side wall perpendicular to a face of the outer member.

* * * * *